(12) United States Patent
Fichtenholtz et al.

(10) Patent No.: US 11,275,593 B2
(45) Date of Patent: *Mar. 15, 2022

(54) LEVERAGING MICROSERVICE CONTAINERS TO PROVIDE TENANT ISOLATION IN A MULTI-TENANT API GATEWAY

(71) Applicant: Oracle International Corporation, Redwood Shores, CA (US)

(72) Inventors: Greg Fichtenholtz, Sunnyvale, CA (US); Shashi Prasad Suravarapu, San Ramon, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/916,873

(22) Filed: Jun. 30, 2020

(65) Prior Publication Data

US 2021/0026703 A1 Jan. 28, 2021

Related U.S. Application Data

(63) Continuation of application No. 16/146,210, filed on Sep. 28, 2018, now Pat. No. 10,740,112.

(Continued)

(51) Int. Cl.
G06F 9/445 (2018.01)
G06F 9/50 (2006.01)
G06F 9/455 (2018.01)

(52) U.S. Cl.
CPC ...... *G06F 9/44505* (2013.01); *G06F 9/45558* (2013.01); *G06F 9/5005* (2013.01);
(Continued)

(58) Field of Classification Search
CPC ............ G06F 9/44505; G06F 9/45558; G06F 9/5027; G06F 9/5077; G06F 2009/45562; G06F 2009/4557; G06F 2009/45579
See application file for complete search history.

(56) References Cited

U.S. PATENT DOCUMENTS 8,819,210 B2 8/2014 Tammam
9,104,456 B2 8/2015 Pacheco et al.
(Continued)

OTHER PUBLICATIONS

"Amazon ECS—Run Containerized Applications in Production", Available Online at: https://aws.amazon.com/ecs/, Jan. 9, 2018, 6 pages.

(Continued)

*Primary Examiner* — Brian W Wathen
(74) *Attorney, Agent, or Firm* — Kilpatrick Townsend & Stockton LLP

(57) ABSTRACT

A system can host APIs for a plurality of different tenants and receive requests from many different client devices. As requests are received, an associated tenant can be identified, and a router can determine if a container instance is available to service the request. A container instance may be an empty container instance including an internal endpoint, a Web server, and a runtime environment. An empty container instance can be unassociated with a particular tenant. To associate a container instance with a tenant, a data store, such as a key-value data store can retrieve configuration files that turn the agnostic container instance into a container instance that is associated with particular tenant and includes configuration code to perform the requisite API functions. The pool of empty and populated containers can be managed efficiently.

20 Claims, 13 Drawing Sheets

Related U.S. Application Data

(60) Provisional application No. 62/566,422, filed on Sep. 30, 2017, provisional application No. 62/566,431, filed on Sep. 30, 2017, provisional application No. 62/566,435, filed on Sep. 30, 2017.

(52) U.S. Cl.
CPC .......... *G06F 9/5027* (2013.01); *G06F 9/5077* (2013.01); *G06F 2009/4557* (2013.01); *G06F 2009/45562* (2013.01); *G06F 2009/45579* (2013.01)

(56) References Cited

U.S. PATENT DOCUMENTS

| | | | |
|---|---|---|---|
| 9,104,514 | B2 | 8/2015 | Bravery et al. |
| 9,471,353 | B1 | 10/2016 | Christopher et al. |
| 9,672,140 | B1 | 6/2017 | Eberlein |
| 9,781,124 | B2 | 10/2017 | Goldberg et al. |
| 2007/0165937 | A1 | 7/2007 | Markov et al. |
| 2012/0180039 | A1 | 7/2012 | Bravery et al. |
| 2013/0247216 | A1 | 9/2013 | Cinarkaya et al. |
| 2015/0006609 | A1 | 1/2015 | Sampath et al. |
| 2015/0120928 | A1 | 4/2015 | Gummaraju et al. |
| 2015/0142878 | A1* | 5/2015 | Hebert .................. G06F 9/4843 709/203 |
| 2016/0261684 | A1 | 9/2016 | Khalaf et al. |
| 2016/0342443 | A1* | 11/2016 | McDermott .......... G06F 12/023 |
| 2017/0180346 | A1* | 6/2017 | Suarez ...................... G06F 8/71 |
| 2017/0286178 | A1 | 10/2017 | Chougule et al. |
| 2017/0359271 | A1 | 12/2017 | Koh et al. |
| 2018/0032410 | A1* | 2/2018 | Kang .................. G06F 9/45558 |
| 2019/0042320 | A1* | 2/2019 | Prince ...................... G06F 8/71 |
| 2020/0319904 | A1* | 10/2020 | Turner .................... G06F 9/455 |

OTHER PUBLICATIONS

Arora et al., "SaaS Solutions on AWS—Tenant Isolation Architectures", Amazon Web Services, Available Online at: https://d0.awsstatic.com/whitepapers/saas-solutions-on-aws-final.pdf, Jan. 2016, pp. 1-26.

Venumbaka, Saisprishnath Reddy, SAP HANA Multitenant Database Containers, Available Online at: https://blogs.saphana.com/2015/01/27/sap-hana-multitenant-database-containers/, Jan. 27, 2015, 8 pages.

International Application No. PCT/US2018/053622, International Preliminary Report on Patentability dated Apr. 9, 2020, 10 pages.

International Application No. PCT/US2018/053622, International Search Report and Written Opinion dated Jan. 29, 2019, 14 pages.

U.S. Appl. No. 16/146,210, First Action Interview Pilot Program Pre-Interview Communication dated Feb. 14, 2020, 5 pages.

U.S. Appl. No. 16/146,210, Notice of Allowance dated Apr. 1, 2020, 7 pages.

\* cited by examiner

LEVERAGING MICROSERVICE CONTAINERS TO PROVIDE TENANT ISOLATION IN A MULTI-TENANT API GATEWAY

CROSS-REFERENCES TO RELATED APPLICATIONS

This application is a continuation of U.S. patent application Ser. No. 16/146,210 entitled "LEVERAGING MICROSERVICE CONTAINERS TO PROVIDE TENANT ISOLATION IN A MULTI-TENANT API GATEWAY" and filed on Sep. 28, 2018, which is hereby incorporated by reference in its entirety for all purposes.

U.S. patent application Ser. No. 16/146,210 claims the benefit of U.S. Provisional Patent Application No. 62/566,422 filed on Sep. 30, 2017; U.S. Provisional Patent Application No. 62/566,431 filed on Sep. 30, 2017; and U.S. Provisional Patent Application No. 62/566,435 filed on Sep. 30, 2017. The entire disclosures of U.S. 62/566,422, 62/566,431, and 62/566,435 are incorporated herein by reference, including the appendices.

BACKGROUND

An application programming interface (API) gateway is a fully managed service that allows developers to create, publish, maintain, monitor, and secure APIs for public consumption. Tenants can define APIs and publish them to these public API gateways, such as cloud platforms, that can then be made available to client devices. In large-scale API gateways, the environment may include a multi-tenant environment where a plurality of different tenants host APIs that are made available through the same hosted service.

SUMMARY

In some embodiments, a method of isolating tenants using containers to service requests in a multi-tenant environment may include receiving a first request for a first service provided by a first tenant; selecting an empty container in the multi-tenant environment; loading a first configuration that implements the first service into the container; servicing the first request from the container; receiving a second request for a second service provided by a second tenant; flushing the first configuration from the container; and servicing the second request from the container.

In some embodiments, a non-transitory, computer-readable medium comprising instructions that, when executed by one or more processors, causes the one or more processors to perform operations including receiving a first request for a first service provided by a first tenant; selecting an empty container in the multi-tenant environment; loading a first configuration that implements the first service into the container; servicing the first request from the container; receiving a second request for a second service provided by a second tenant; flushing the first configuration from the container; and servicing the second request from the container.

In some embodiments, a system may include one or more processors and one or more memory devices including instructions that, when executed by the one or more processors, cause the one or more processors to perform operations including receiving a first request for a first service provided by a first tenant; selecting an empty container in the multi-tenant environment; loading a first configuration that implements the first service into the container; servicing the first request from the container; receiving a second request for a second service provided by a second tenant; flushing the first configuration from the container; and servicing the second request from the container.

In any embodiments, any or all of the following features may be included in any combination and without limitation. The container may be one of a plurality of containers in the multi-tenant environment that are instantiated to service requests from client devices. The first configuration may include a size of a heap in memory that can be used by the first service. After flushing the first configuration from the container, the container may include a runtime process with an embedded server and an internal endpoint. The internal endpoint may be called by a router in the multi-tenant environment to service the second request. The first configuration may include a plurality of actions that are chained together to service requests. The multi-tenant environment may prevent the container from simultaneously servicing requests associated with different tenants. The multi-tenant environment may allow the container to simultaneously service requests associated with a single tenant. The method/operations may also include receiving a third request for the second service provided by the second tenant, and servicing the third request from the container without flushing the second configuration from the container. The first service may include a public API that is made available through the multi-tenant environment.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein, are embodiments for managing an API Gateway. A cloud system can host APIs for a plurality of different tenants and receive requests from many different client devices. As requests are received, an associated tenant can be identified, and a router can determine if a container instance is available to service the request. A container instance may be an empty container instance including an internal endpoint, a Web server, and a runtime environment. An empty container instance can be unassociated with a particular tenant. To associate a container instance with a tenant, a data store, such as a key-value data store can retrieve configuration files that turn the agnostic container instance into a container instance that is associated with particular tenant and includes configuration code to perform the requisite API functions. When the API in the container finishes servicing the request (or multiple requests for a single tenant), runtime state information can be saved back to the data store, and the contents of the container instance can be flushed. This guarantees isolation between tenant data in a multi-tenant environment while still allowing container reuse and efficient management of pooled resources. The data store can maintain a service registry to enable the routers in the system to allocate new container instances when needed and deallocate container instances when they are not being used. The data store can also store runtime state information, configurations, and applications for tenant APIs that can be distributed to any container in an on-demand basis.

Figure 1:
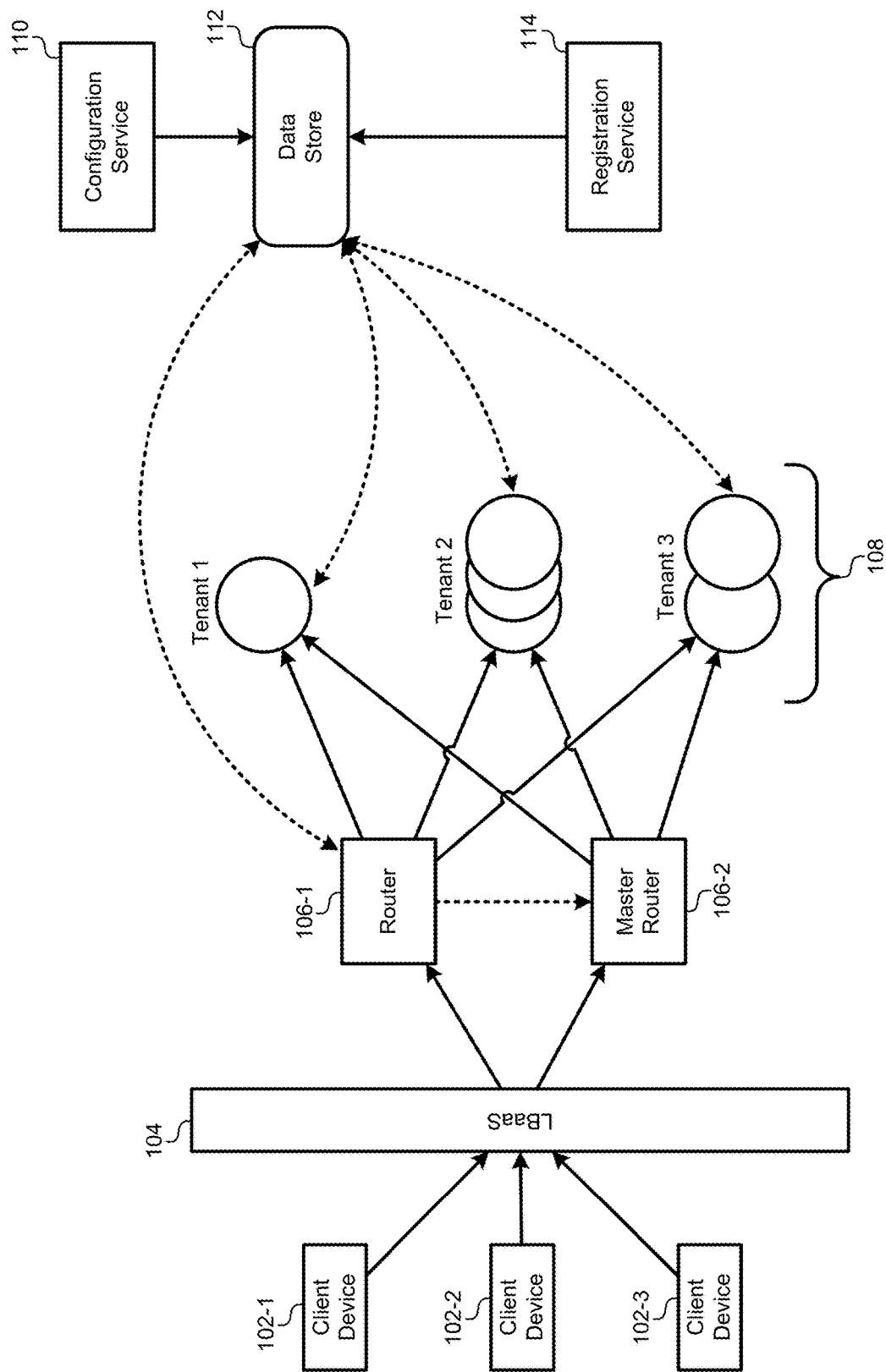
FIG. 1 illustrates a simplified block diagram of a system for handling requests in a multi-tenant environment, according to some embodiments.

FIG. 1 illustrates a simplified block diagram of a system for handling requests in a multi-tenant environment, according to some embodiments. Throughout this disclosure, an example of an API gateway may be used. However, the embodiments described herein are not so limited. Instead, the functions described for handling requests for the API gateway can be implemented in any system that has an interface for receiving requests.

A plurality of client devices 102 (e.g., smart phones, laptops, tablet computers, workstations, servers, etc.) can send requests to a public interface 104, which may include a Load Balancer as a Service (LBaaS) interface. These requests may be associated with a specific tenant of the multi-tenant environment, and may reference a specific service provided by the tenant, such as an API function. For example, a request received from one of the client devices 102 may include information such as "Tenant:ACME, API:ProcessInvoice." The public interface 104 can funnel the request to one or more routers 106.

The routers 106 can communicate with a data store 112 both periodically and in real-time to determine one or more containers that are assigned to the tenant and able to process particular requests. In the example of FIG. 1, a request for Tenant 2 would have three different container instances from which the routers 106 can choose. Within the set of container instances that are assigned to Tenant 2, the routers 106 can select one or more container instances that are loaded with configurations and/or applications that service the request. For example, the routers 106 can select one of the three container instances assigned to "Tenant:ACME" that is loaded with a configuration for handling "API:ProcessInvoice." If no instances are already loaded with this configuration, the routers 106 can select an existing empty container or instantiate a new empty container. The routers 106 can then cause the data store 112 to transfer a configuration specific to "API:ProcessInvoice" into the existing/new empty container to create a containerized service that can handle the specific request for "Tenant:ACME."

Once the containerized service handles the request and (if necessary) returns a response to the client device, the containerized service can be either reused to service additional requests for that specific tenant/service combination, or the container can be flushed of its contents can be made available to other tenants. When a container is flushed and reassigned to a different tenant, runtime information that needs to be saved in the container can be sent back to the data store 112. This ensures that the next time that specific application or API is instantiated in an empty container, the runtime information can be transferred and used by the new container to continue execution where it left off.

A registration service 114 can be used to enroll new tenants into the multi-tenant environment. New tenants can use an interface of the registration service 114 to generate a new tenant entry in the data store 112 and to define parameters for their usage of the multi-tenant environment. These parameters may include maximum, minimum, average, and expected numbers of container instances that are available to that particular tenant. Additionally, new tenants can select numbers and types of routers to service the request, different configuration services that may be available, different configurations of runtime container pools, and other aspects of the registration process.

A configuration service 110 may provide Web-based user interfaces that allow tenants to define configurations and select applications that can be made available through the public interface. For example, some embodiments may provide a series of web forms and drop-down boxes that allow tenants to select from a plurality of different microservices, applications, functions, and so forth, to build an API. Some embodiments may also allow tenants to select applications that can be run, such as applications to limit a number of times an API can be called within a predetermined time limit. After configurations and applications are selected/defined through the configuration service 110, these can be stored in the data center 112 for placement into empty containers in the system.

Note that a given gateway can cater to more than one tenant concurrently. In some embodiments, multiple gateways can exist which are completely isolated and running on different availability domains or data centers. For example, there may be a gateway for Chicago and a gateway for Phoenix. However, both of these gateways may still serve the same tenant. The end-user may still deploy APIs to one or any combination of the multiple gateways using unique gateway IDs. In some embodiments, each gateway may have its own unique key-value data store for storing configurations, applications, and so forth.

Figure 2:
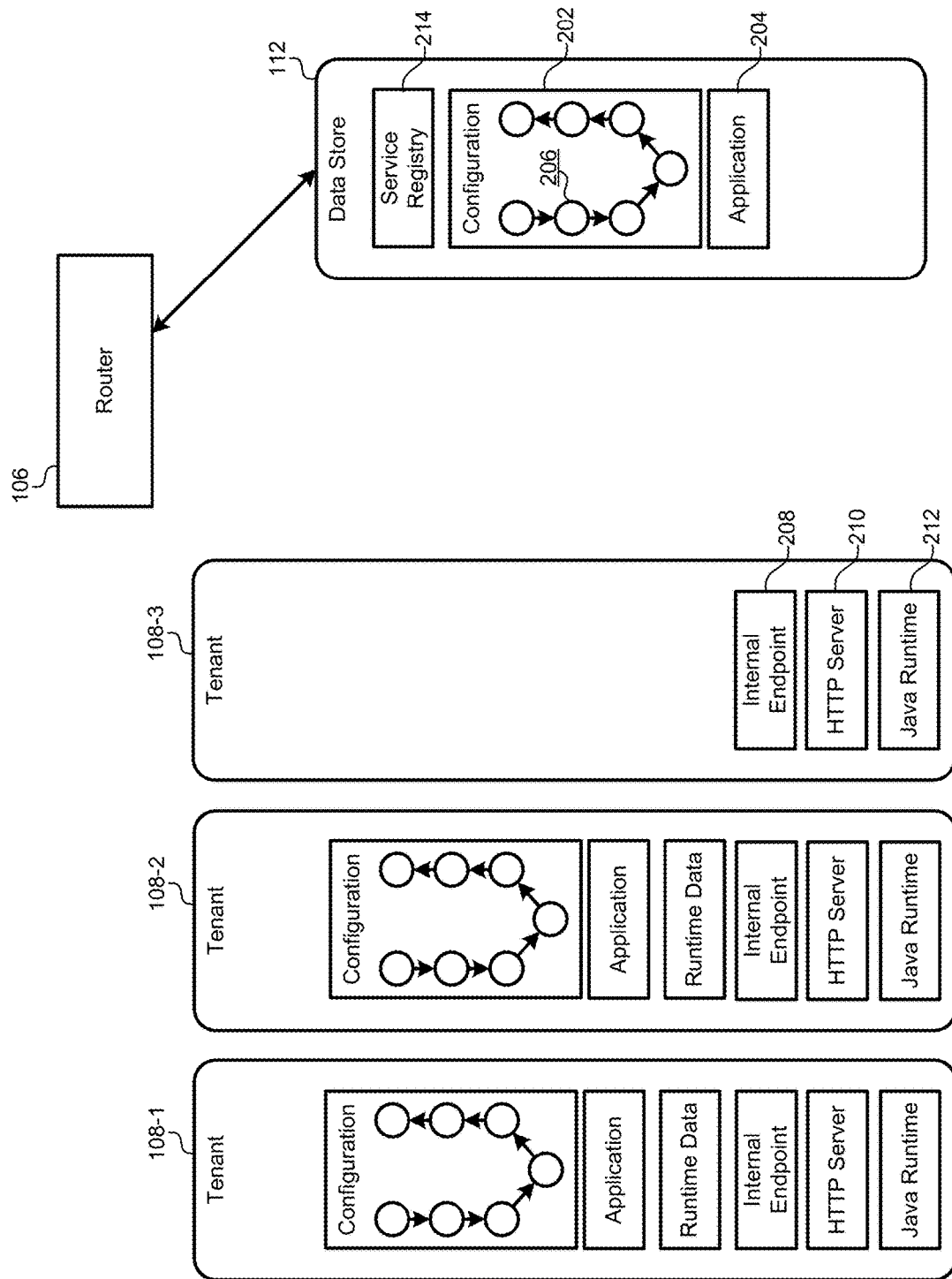
FIG. 2 illustrates a diagram of container instances 108 being prepared to service requests for tenants, according to some embodiments.

The following figures walk through one example of how a request can be processed by the system. These examples are not meant to be limiting. FIG. 2 illustrates a diagram of container instances 108 being prepared to service requests for tenants, according to some embodiments. At this stage, the router 106 has received a request to be serviced. First, the router 106 can work in conjunction with the data store 112 to determine whether an available container instance is operating and available to service the request. The data store 112 can include a service registry 214 that catalogs each of the available instances in the system. The service registry 214 can also track which APIs and tenants are assigned to each instantiated container. When new containers are instantiated or existing containers are removed, the service registry 214 can be updated in real-time by the data store 112. The router 106 can keep a local copy at least a portion of the service registry 214. The data store 112 can intermittently update the router 106 with a list of changes to the service registry 214. In some embodiments, the data store 112 can update the router 106 with a list of available container instances that can receive requests. In some embodiments, only changes or portions of the service registry 214 are transmitted to the router 106 because the total list of instances in the system may be very large.

As illustrated in FIG. 1, some embodiments may include a plurality of routers 106. One of the routers 106-2 can be designated as a master router. The master router 106-2 can be designated as the only one of the routers 106 that is allowed to instantiate new container instances when needed. Therefore, if the router 106 in FIG. 2 is designated as the master router, it can freely instantiate a new container instance if needed to service a request for a particular tenant. The master router 106-2 can analyze the settings provided by the tenant during registration to ensure that the number of container instances assigned to the tenant in the pool is within the minimum/maximum numbers for that particular tenant. If one of the routers 106 is handling a request that requires a new container to be instantiated, the router 106-1 can forward the request to the master router 106-2, and the master router 106-2 can determine whether or not to instantiate a new container. By only allowing the master container 106-2 to instantiate new containers, this helps to guarantee that the size of the container pool is managed efficiently. For example, if six different routers all received simultaneous requests for a particular service for particular tenant, each of these routers could independently decide to instantiate new containers when a single instantiated container would suffice. Funneling each of these requests to the master router 106-2 ensures that only the minimum number of new containers is instantiated.

Conversely, if the router 106 and/or the data store 112 determine that a tenant is assigned a number of container instances that are not being used, or that a number of unassigned containers are available in the container pool, a determination can be made that one or more of these unused containers can be eliminated from the system, thereby freeing memory and processing power for existing containers to operate. This provides for a dynamic pool of container instances that can service requests. This pool can dynamically grow/shrink based on how heavy the received request traffic is at any given time. As will be described below, flushing container contents allows containers to be reused between different tenants while still ensuring that tenants are isolated from each other.

One technical advantage achieved by these embodiments is the efficient management of the size of the container pool. A runtime pool may be a collection of runtime instances that all share common properties. Runtime instances in the pool of containers may be sequentially numbered starting with index 0 such that a given runtime instance is uniquely identified by a pair of values: {pool name, instance index}. Pool management may depend on the particular container environment used by each embodiment. For example, a Java class may be used to implement pool functionality using a Docker daemon REST API to create/start/stop runtime containers as needed. This class may allow the environment to set a name for the pool, numbers for the port(s), numbers for the debug ports, timeout values for container state transitions (described in detail below), and so forth. Some embodiments may also allow this class to specify a "minSize" value representing a number of running container instances that are not bound to any tenants that will be available for servicing requests. Additionally, a "maxSize" value may specify a maximum number of runtime container instances in the container pool.

Once a service is assigned to a container in the gateway, the service may perform a periodic "heartbeat" as an indication to other services that it is alive and functioning properly. For example, when a service is loaded into a container, it may perform a heartbeat to let the router(s) know that it is available to service requests. Performing a heartbeat may include updating a corresponding entry in the service registry of the data store 112. These heartbeat transmissions can be used to determine the lifecycle of a container in the gateway. For example, some embodiments may use a time-to-live (TTL) interval after which a service may be considered inactive. Alternatively, some embodiments may specify a number of heartbeats that are allowed to be skipped/missed before the service is considered inactive. Heartbeats may occur regularly, such as every 10 seconds, 20 seconds, 30 seconds, 60 seconds, and so forth.

In the example of FIG. 2, the router 106 can identify an empty container 108-3 that is not currently assigned to a particular tenant, or is assigned to the tenant of the request but not populated with a configuration to run the specific API of the request. Note that container 108-1 and container 108-2 are populated with configurations and assigned to specific tenants. Because they operate in separate containers from container 108-3, the data and operations of these three containers may be strictly isolated from each other.

Figure 3:
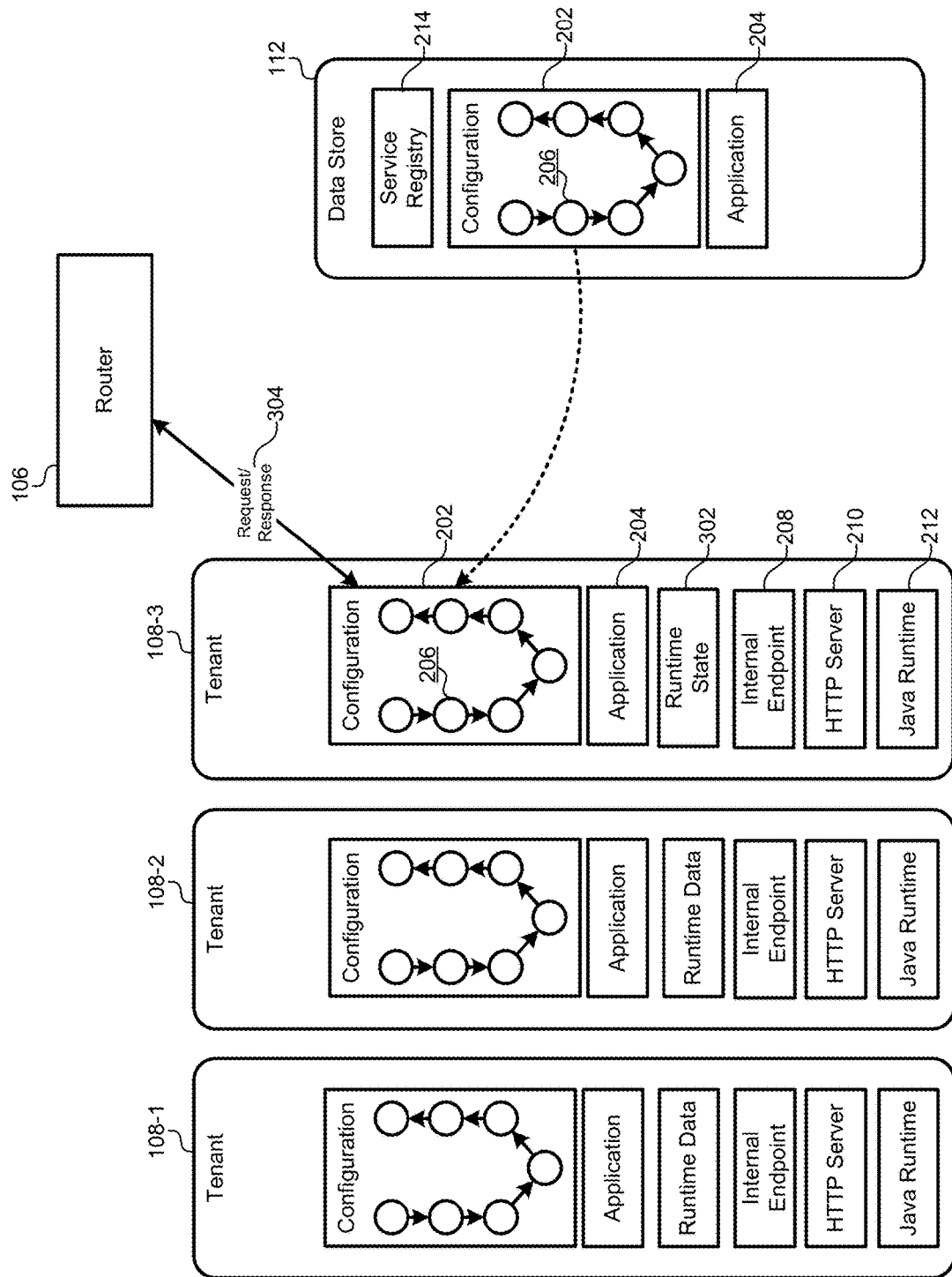
FIG. 3 illustrates a block diagram of how an empty container instance can be populated with files from the data store, according to some embodiments.

FIG. 3 illustrates a block diagram of how an empty container instance can be populated with files from the data store 112, according to some embodiments. Continuing with the example of FIG. 2, the empty container 108-3 can be assigned to handle the request 304 for the particular tenant. First, the container 108-3 can be assigned to that tenant such that no other tenant's requests can be serviced through the container 108-3. Next, the tenant and API information from the request 304 can be used to look up configuration, application, and runtime information in the data store 112. In some embodiments, the data store 112 may be a key-value data store. Some embodiments may also allow the data store 112 to be distributed onto different systems in the multi-tenant environment or across different platforms. For example, the tenant and/or API from the request 304 can be used as a key to look up a value in the data store 112 that returns the configuration 202, an application 204, and/or any runtime state information.

In some embodiments, the key-value data store 112 may be used to persist tenant-specific configurations to disk. Additionally, the key-value data store can provide the central service registry 214 such that all running micro services "register" themselves so that other services can locate and invoke them. For example, a distributed key-value data store such as etcd® may be used to store state information such as: configurations fetched from a management service (e.g., policies, APIs, applications, plan metadata, etc.); runtime container states in the service registry 214; container pool configurations (e.g., minimums, maximums, strategies, timeout intervals, etc.); tenant registration statuses (e.g., tenant, tenant-pool binding, etc.); rate-limiting configurations, real-time states, and so forth.

The configuration 202 may include a pipeline of actions 206 that have been defined in the configuration service 110 of FIG. 1. These actions 206 may be chained together to form an API or other service to process data. Each of the actions 206 may include things such as receiving a request, parsing the payload in the request, processing data in the payload, changing data in the payload, calling another service to acquire information, writing information to a file or database, and/or generating a response. In some embodiments, the configuration 202 can handle multiple requests at the same time. Thus, a single container populated with the configuration 202 can handle a plurality of requests for that specific API and that specific tenant. Generally, configurations are stateless (e.g., RESTful), and are very efficient at processing information and generating responses quickly.

In addition to returning a configuration 202, the data store 112 can return one or more applications 204 that may also run in the container alongside the API configuration 202. For example, the application 204 may be a bandwidth limiting application that limits the number of times a particular API can be called within a predetermined time interval (e.g., only 100 requests can be serviced every hour). In contrast to the configuration 202, the application 204 may require runtime state information to be saved between executions of the application. In FIG. 3, the application 204 may not have run in the past, so it is possible that no state runtime information is saved for the application 204 in the data store 112. The container 108-3 may now represent a microservice that is assigned to a single tenant for the purpose of processing a particular API request. Once the container 108-3 is bound to a tenant, the instance can load all of the new configuration information, such as API definitions, applications, plans, subscriptions, in an on-demand fashion from the data store 112.

The empty container can be a software container such as a Docker® container, and the multi-tenant environment can include an orchestrated container platform, such as Kubernetes®. Instantiating a new empty container may include generating an empty container from a container image and populating it with a minimal number of software processes that will be common to any configuration used in the system. For example, some embodiments may designate an empty container as a Docker® container that includes a runtime environment 212 such as a Java Runtime Environment® (JRE), a web server 210 such as an HTTP server, and an internal endpoint 208. The internal endpoint 208 can be exposed to the routers 106 and can be used by the routers 106 to send a request to the container 108-3. In some embodiments, other container environments may be used other than Docker® containers. For example, some embodiments may use UNIX processes to start/stop runtime containers.

When the empty container is populated, the data store 112 can transfer the configuration 202 and the application 204 to the container 108-3. If runtime state data 302 was available in the data store 112, it would also be transferred to the container 108-3 in this case, runtime state data 302 is generated by the application as it runs and is stored in the container 108-3. For example, the application 204 may record the number of requests received within a given time interval. This information can be saved in the runtime state 302 and transferred back to the data store 112 when this container 108-3 is flushed. Generally, transferring a configuration 202, application 204, and/or runtime state 302 to an empty but instantiated container 108-3 is a relatively lightweight process that can be done very quickly and efficiently to handle requests without appreciable delay.

Figure 4:
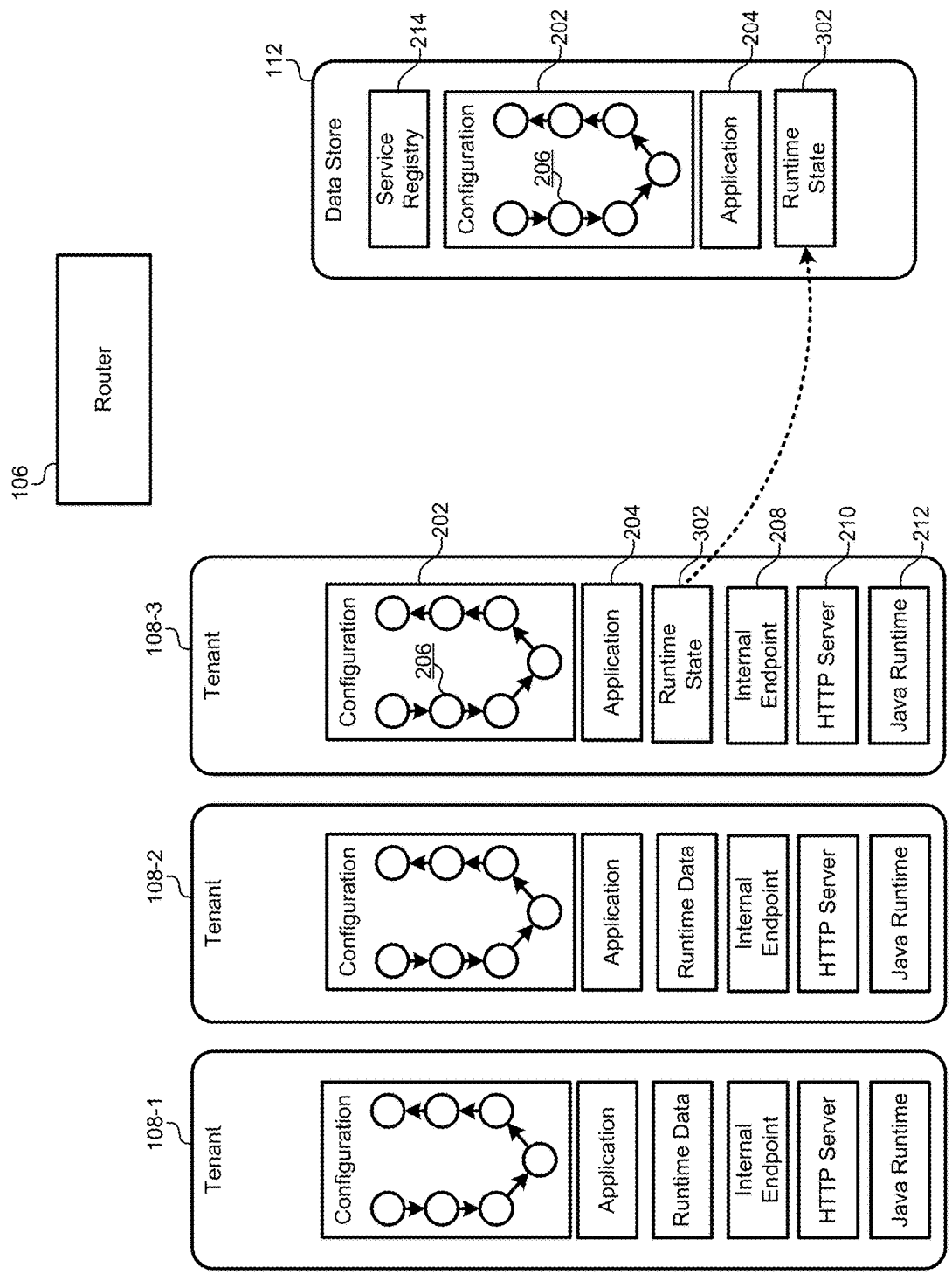
FIG. 4 illustrates how the populated container can service the request, according to some embodiments.

FIG. 4 illustrates how the populated container 108-3 can service the request, according to some embodiments. The container 108-3 can service any requests for this tenant for the API defined by the configuration 202. In some cases, this may include only processing the single request that caused the configuration 202 to be transferred to the container 108-3. In other cases, this may include processing a plurality of similar requests sent to the routers 106 for the same tenant. After all the requests have been processed and the responses (if any) have been sent back to the requesting client devices, the container 108-3 can become idle, or passive. While the container 108-3 is still assigned or bound to the specific tenant, it is not currently being used to process any requests. After predetermined time interval, the container 108-3 can be unassigned from that particular tenant and placed back into the pool of available containers 108-3 awaiting assignment to a new tenant with new configurations.

Before the container 108-3 is flushed and reassigned to a different tenant, any runtime state information 302 that was generated or updated by the application 204 running on the container 108-3 can be saved in the data store 112. The runtime state information 302 can then be transmitted to a different container when the configuration 202 and/or application 204 is reassigned to a new container to service future requests.

Figure 5:
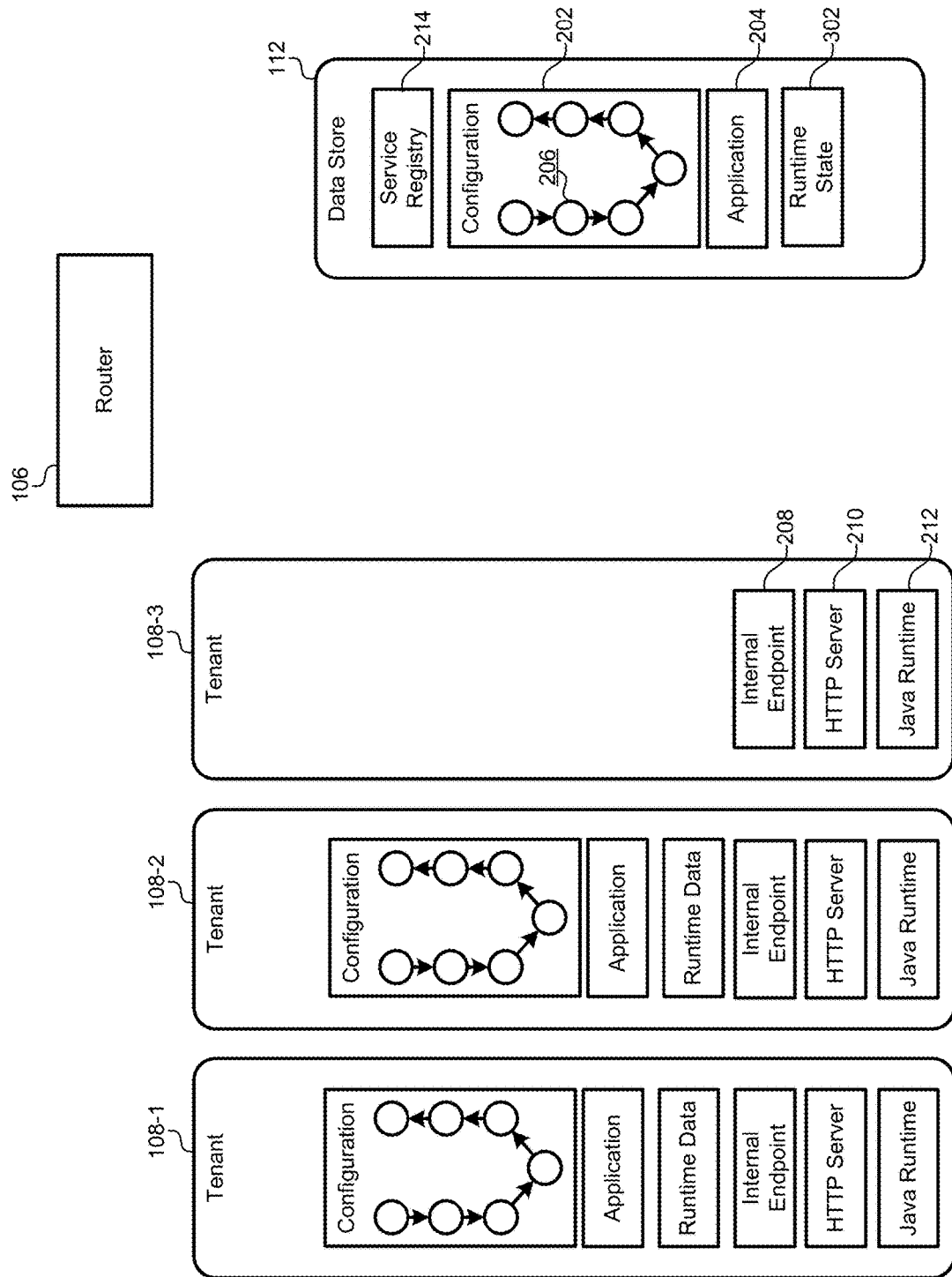
FIG. 5 illustrates a simplified block diagram of a container being placed back into the pool of available containers, according to some embodiments.

FIG. 5 illustrates a simplified block diagram of a container 108-3 being placed back into the pool of available containers, according to some embodiments. After the runtime state information 302 is transferred back to the data store 112, the container 108-3 can be flushed of the configuration 202, the application 204, and/or the runtime state 302. The empty container 108-3 can now be reassigned by the router 106 to a different tenant to service a different API call. Although only container 108-3 is shown to be empty in FIG. 5, actual deployments may typically include a plurality of empty containers. The router 106 can use different strategies to assign requests to one of the plurality of available empty containers, such as a round-robin strategy. As described above, if the container 108-3 is not assigned to a new tenant/API within a predetermined time interval, the container 108-3 can be removed from the multi-tenant environment to preserve memory and/or computing resources.

As described above, the data store 112 facilitates these operations by distributing configurations, applications, and runtime states to various containers operating in the multi-tenant environment. The data store 112 may also receive configuration information from tenants at initial registration and even at runtime. The data store 112 also maintains the service registry 214 that monitors the state of the container pool at any time. The data store 112 uses this service registry 214 to communicate with the routers 106 to determine when the pool of available containers should grow and/or shrink.

Figure 6A:
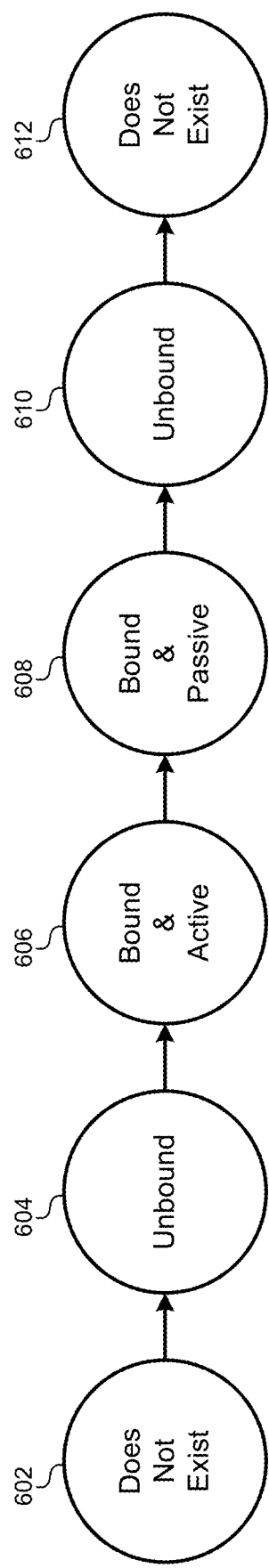
FIG. 6A illustrates a state diagram of the lifecycle of a container in the multi-tenant environment, according to some embodiments.

FIG. 6A illustrates a state diagram of the lifecycle of a container in the multi-tenant environment, according to some embodiments. At an initial state 602, the container does not exist. At state 604, the container has been instantiated with the set of processes described above (e.g., web server, endpoint, etc.), but the container is unbound or unassigned to a particular tenant and empty. When servicing a request, the container can enter state 606 where it is bound or assigned to a particular tenant and populated with a configuration, application, and/or runtime state information. State 606 is referred to as active because the container may be actively servicing requests received from the routers 106. In state 608, the container may still be bound or assigned to the particular tenant, but is passive, in that it is not actively processing any requests with its internally stored configuration. After sitting idle for a predetermined time interval, the container can be unassigned or unbound in state 610. When a container is no longer bound to a particular tenant, the internal configuration, application, and/or runtime state can be flushed. In some embodiments, an unbound container does not need to flush its internal contents until it is reassigned to a new tenant. If the container is not assigned to a new tenant, then the container can be removed in state 612.

Figure 6B:
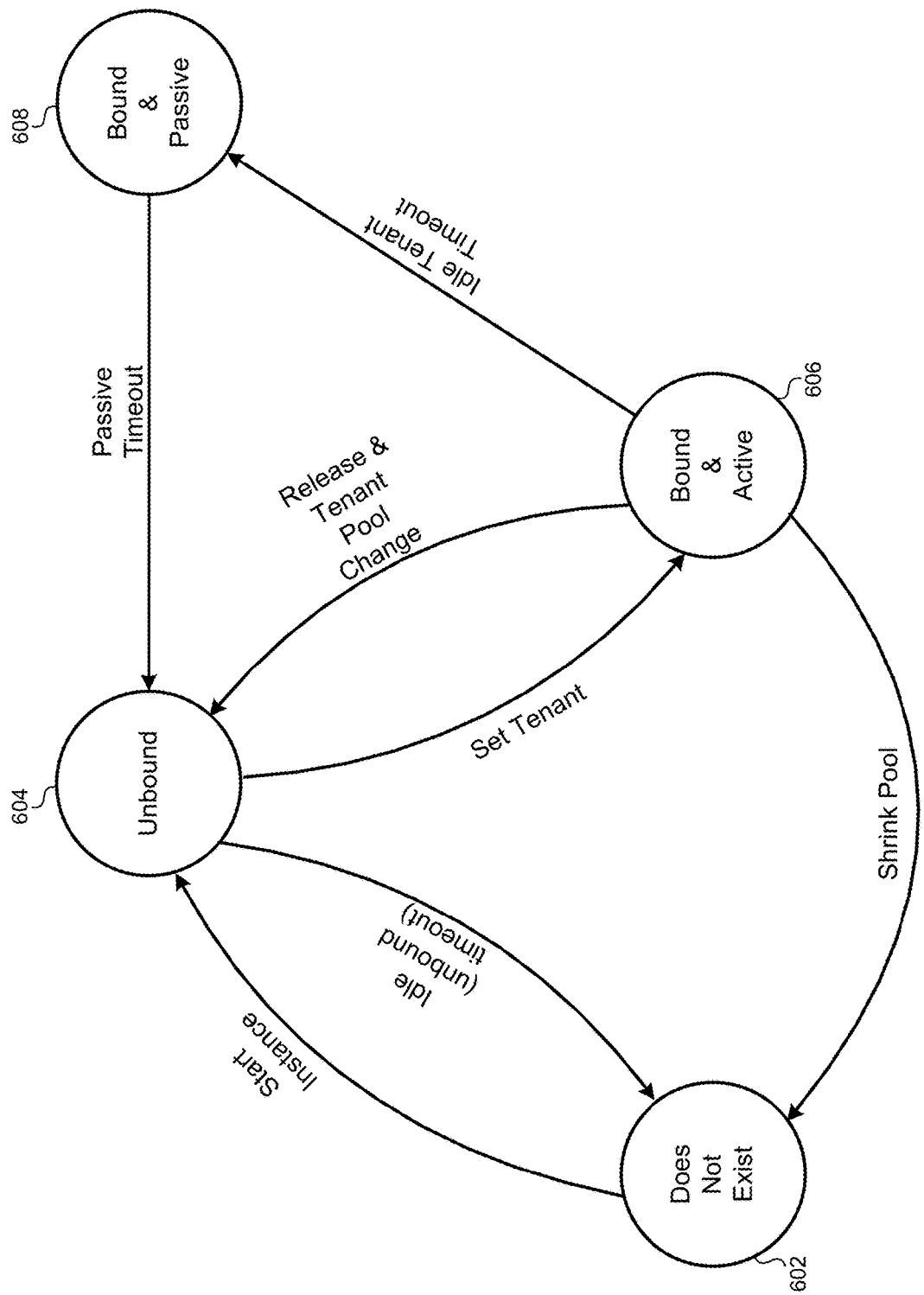
FIG. 6B illustrates an alternative state diagram of the lifecycle of a container in the multi-tenant environment, according to some embodiments.

FIG. 6B illustrates another view of the state diagram from FIG. 6A illustrating the lifecycle of a container in a multi-tenant environment, according to some embodiments. At the initial state 602, the container does not yet exist or has been deleted from the container environment. When a container instance has been created it may be unbound in state 604. If the container is idle for a predetermined time interval, referred to as an "unbound timeout," then the container can be deleted from the environment and move back to state 602. Alternatively, the container can be assigned to a tenant and loaded with a configuration, application, state information, etc., in state 606. From the bound and active state 606, the container can be removed from the environment if the router shrinks the size of the pool of containers and thus transition back to state 602. The container can also be released from the tenant, have its tenant-specific contents flushed, and be returned to the unbound pool of containers in state 604. Furthermore, a bound and active container in state 606 can become passive in state 608 if it remains idle without servicing any client requests for a predetermined time interval referred to as an "idle tenant timeout." From the bound and passive state 608, a "passive timeout" interval can expire and cause the container to transition from the bound and passive container state 608 to the unbound pool of containers in state 604. This container lifecycle can transition between states as long as the container exists.

Figure 7:
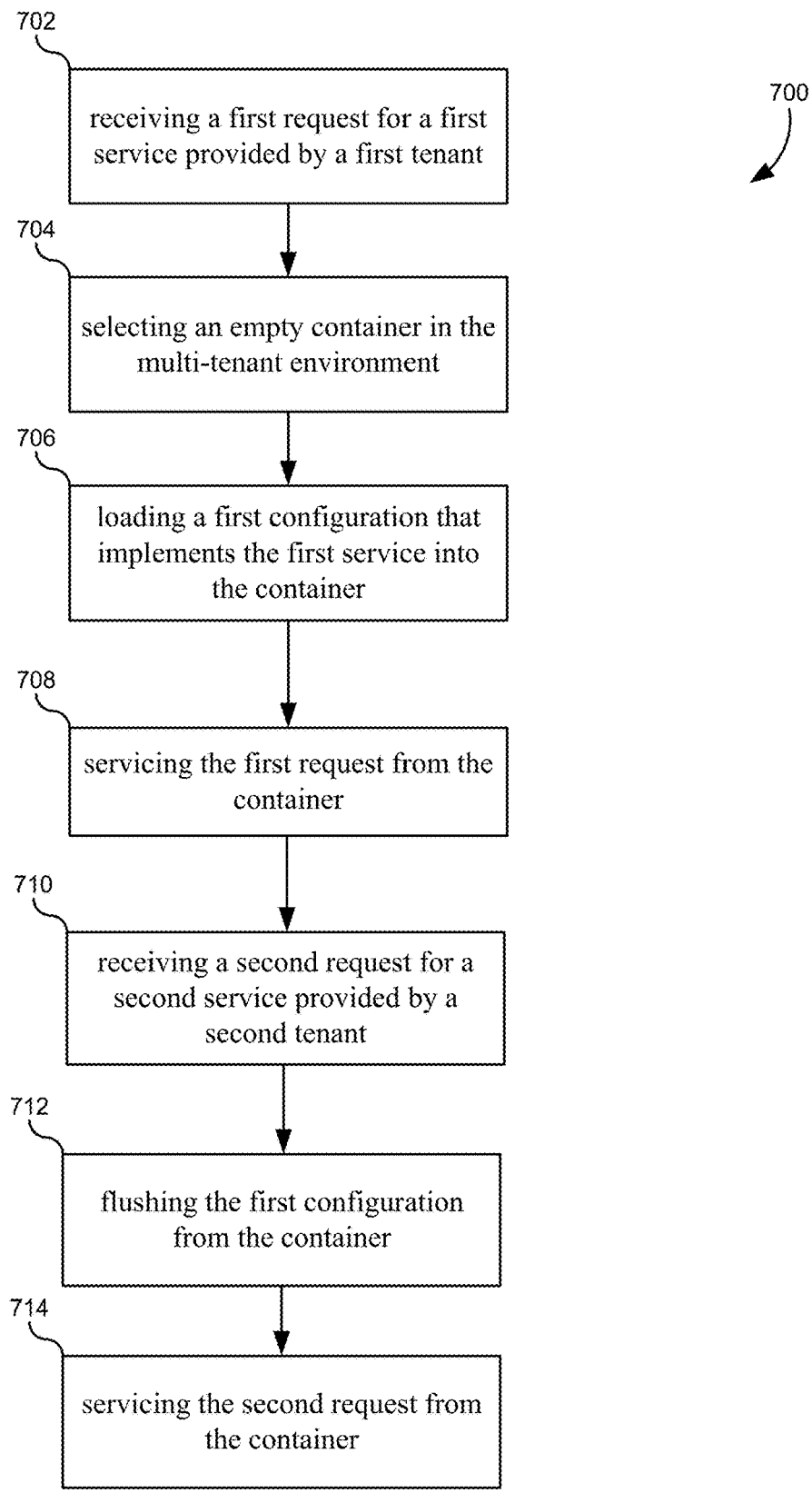
FIG. 7 illustrates a flowchart of a method of isolating tenants using containers to service requests in a multi-tenant environment.

FIG. 7 illustrates a flowchart of a method of isolating tenants using containers to service requests in a multi-tenant environment. The method may include receiving a first request for a first service provided by a first tenant (702). The method may also include selecting an empty container in the multi-tenant environment (704). The method may additionally include loading a first configuration that implements the first service into the container (706). The method may further include servicing the first request from the container (708). The method may also include receiving a second request for a second service provided by a second tenant (710). The method may additionally include flushing the first configuration from the container (712). The method may further include servicing the second request from the container (714). Some embodiments may include a system that includes one or more processors and one or more memories that perform these method steps. Other embodiments may include non-transitory, computer readable mediums that store instructions that cause one or more processors to execute these method steps.

In any embodiments, one or more of the following features may be included in any combination and without limitation. The container may be one of a plurality of containers in the multi-tenant environment that are instantiated to service requests from client devices. After flushing the first configuration from the container, the container may include a runtime process with an embedded server and an internal endpoint. The internal endpoint may be called by a router in the multi-tenant environment to service the second request. The first configuration may include a plurality of actions that are chained together to service requests. The multi-tenant environment may prevent the container from simultaneously servicing requests associated with different tenants. The multi-tenant environment may allow the container to simultaneously service requests associated with a single tenant. The method may also include receiving a third request for the second service provided by the second tenant, and servicing the third request from the container without flushing the second configuration from the container. The first service may include a public API that is made available through the multi-tenant environment.

It should be appreciated that the specific steps illustrated in FIG. 7 provide particular methods of isolating tenants using containers to service requests in a multi-tenant environment according to various embodiments of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
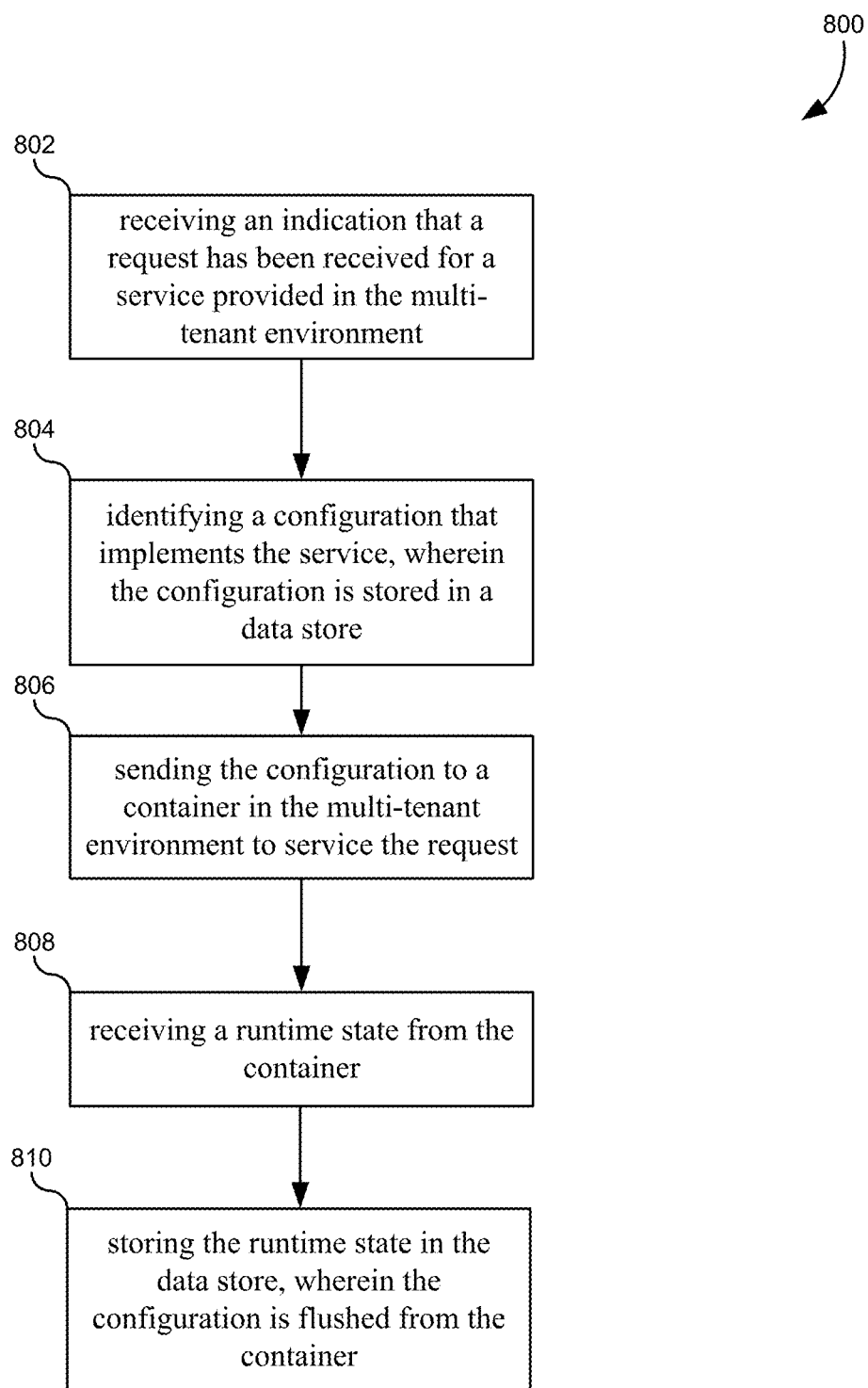
FIG. 8 illustrates a flowchart of a method of managing runtime states and service configurations for containers in a multi-tenant environment, according to some embodiments.

FIG. 8 illustrates a flowchart of a method of managing runtime states and service configurations for containers in a multi-tenant environment, according to some embodiments. The method may include receiving an indication that a request has been received for a service provided in the multi-tenant environment (802). The method may additionally include identifying a configuration that implements the service, wherein the configuration is stored in a data store (804). The method may also include sending the configuration to a container in the multi-tenant environment to service the request (806). The method may further include receiving a runtime state from the container (808). The method may also include storing the runtime state in the data store, where the configuration is flushed from the container (810). Some embodiments may include a system that includes one or more processors and one or more memories that perform these method steps. Other embodiments may include non-transitory, computer readable mediums that store instructions that cause one or more processors to execute these method steps.

In any embodiments, one or more of the following features may be included in any combination and without limitation. The configuration may be provided by a tenant of the multi-tenant environment prior to runtime. The data store may include a key-value data store. The key-value data store may include a distributed key-value data store. An identity of a tenant associated with the service may be a key in the key-value data store, and the configuration and runtime state may be a value in the key-value data store. The data store may also store a registry of containers that are available in the multi-tenant environment. The data store may update one or more routers in the multi-tenant environment when new containers become available in the multi-tenant environment based on the registry of containers.

It should be appreciated that the specific steps illustrated in FIG. 8 provide particular methods of managing runtime states and service configurations for containers in a multi-tenant environment according to various embodiments. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
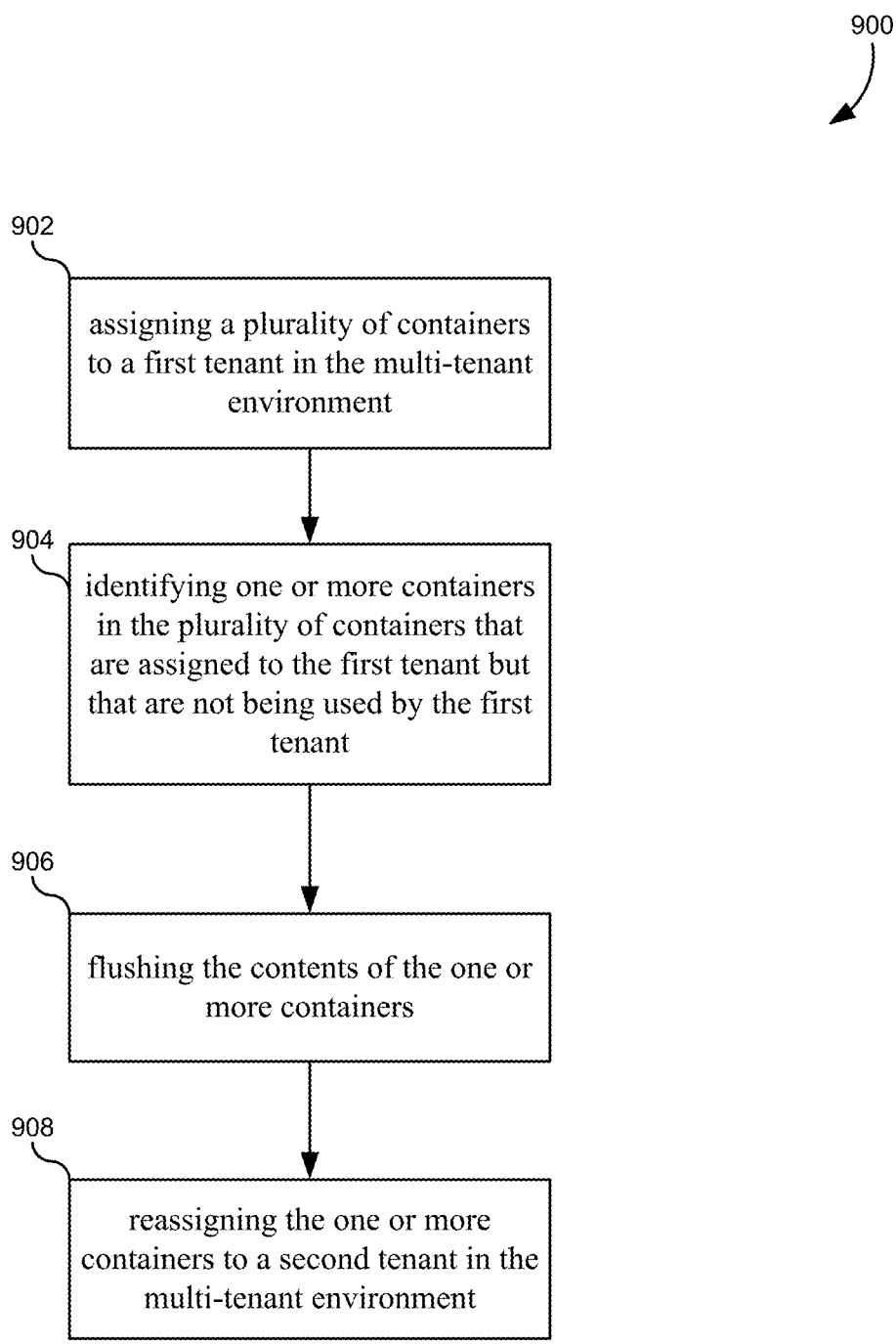
FIG. 9 illustrates a flowchart of a method of efficiently allocating a pool of containers for servicing requests in a multi-tenant environment, according to some embodiments.

FIG. 9 illustrates a flowchart of a method of efficiently allocating a pool of containers for servicing requests in a multi-tenant environment, according to some embodiments. The method may include assigning a plurality of containers to a first tenant in the multi-tenant environment (902). The method may also include identifying one or more containers in the plurality of containers that are assigned to the first tenant but that are not being used by the first tenant (904). The method may additionally include flushing the contents of the one or more containers (906). The method may further include reassigning the one or more containers to a second tenant in the multi-tenant environment (908). Some embodiments may include a system that includes one or more processors and one or more memories that perform these method steps. Other embodiments may include non-transitory, computer readable mediums that store instructions that cause one or more processors to execute these method steps.

In any embodiments, one or more of the following features may be included in any combination and without limitation. After flushing the contents of the one or more containers, the one or more containers need not be assigned to any tenant for a first time interval before being reassigned to the second tenant. The method may also include identifying second one or more containers in the plurality of containers that are assigned to the first tenant but that are not being used by the first tenant; determining that no other tenants need the second one or more containers; and removing the second one or more containers from the multi-tenant environment. The method may additionally include determining that the first tenant is receiving more requests than can be serviced by the plurality of containers. The method may further include instantiating a new plurality of containers; and assigning the new plurality of containers to the first tenant. The method may also include assigning containers that were previously assigned to another tenant to the first tenant. A gateway of the multi-tenant environment may reassign the one or more containers to the second tenant in the multi-tenant environment.

It should be appreciated that the specific steps illustrated in FIG. 9 provide particular methods of efficiently allocating a pool of containers for servicing requests in a multi-tenant environment according to various embodiments. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 10:
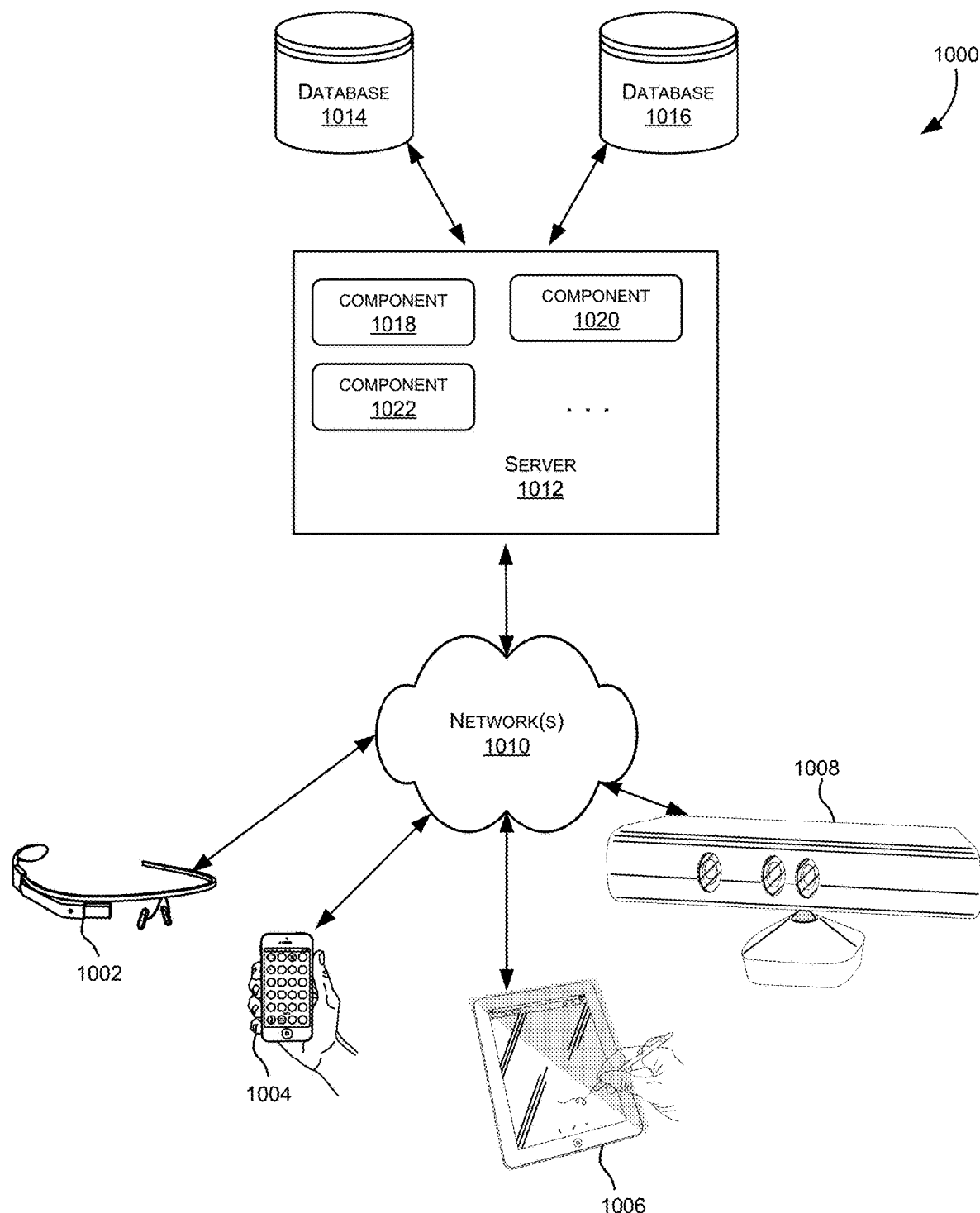
FIG. 10 illustrates a simplified block diagram of a distributed system for implementing some of the embodiments.

FIG. 10 depicts a simplified diagram of a distributed system 1000 for implementing one of the embodiments. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications provided by one or more of the components of the system. In some embodiments, these services may be offered as web-based or cloud services or under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in the figure, the software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in the figure is thus one example of a distributed system for implementing an embodiment system and is not intended to be limiting.

Client computing devices 1002, 1004, 1006, and/or 1008 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1002, 1004, 1006, and 1008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1010.

Although exemplary distributed system 1000 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), such as one based on Ethernet, Token-Ring and/or the like. Network(s) 1010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1012 may be adapted to run one or more services or software applications described in the foregoing disclosure. For example, server 1012 may correspond to a server for performing processing described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 11:
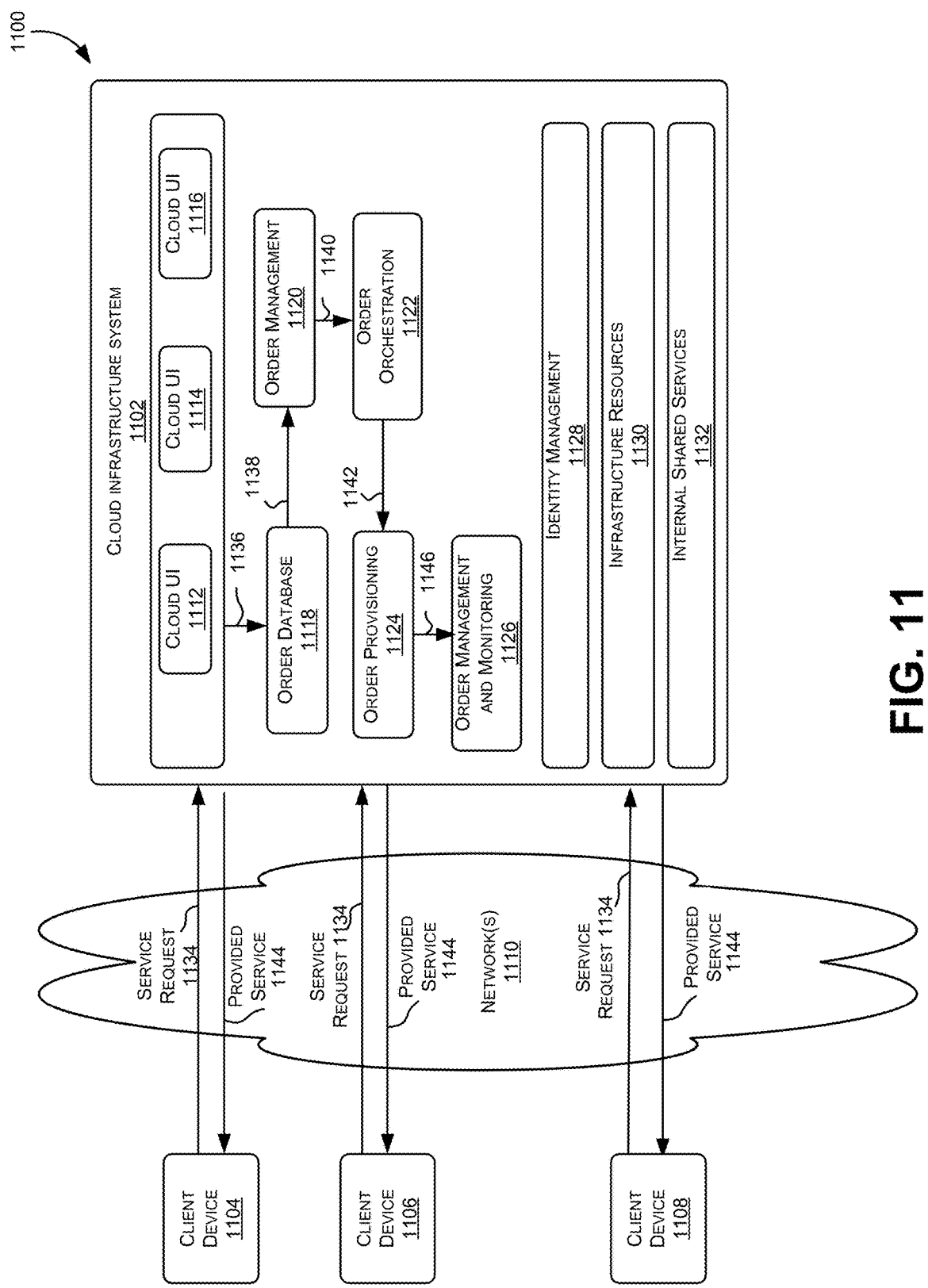
FIG. 11 illustrates a simplified block diagram of components of a system environment by which services provided by the components of an embodiment system may be offered as cloud services.

FIG. 11 is a simplified block diagram of one or more components of a system environment 1100 by which services provided by one or more components of an embodiment system may be offered as cloud services, in accordance with an embodiment of the present disclosure. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the invention. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 1002, 1004, 1006, and 1008.

Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 1010.

Cloud infrastructure system 1102 may comprise one or more computers and/or servers that may include those described above for server 1012.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116.

At operation 1136, the order is stored in order database 1118. Order database 1118 can be one of several databases operated by cloud infrastructure system 1118 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1100 may include an identity management module 1128. Identity management module 1128 may be configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
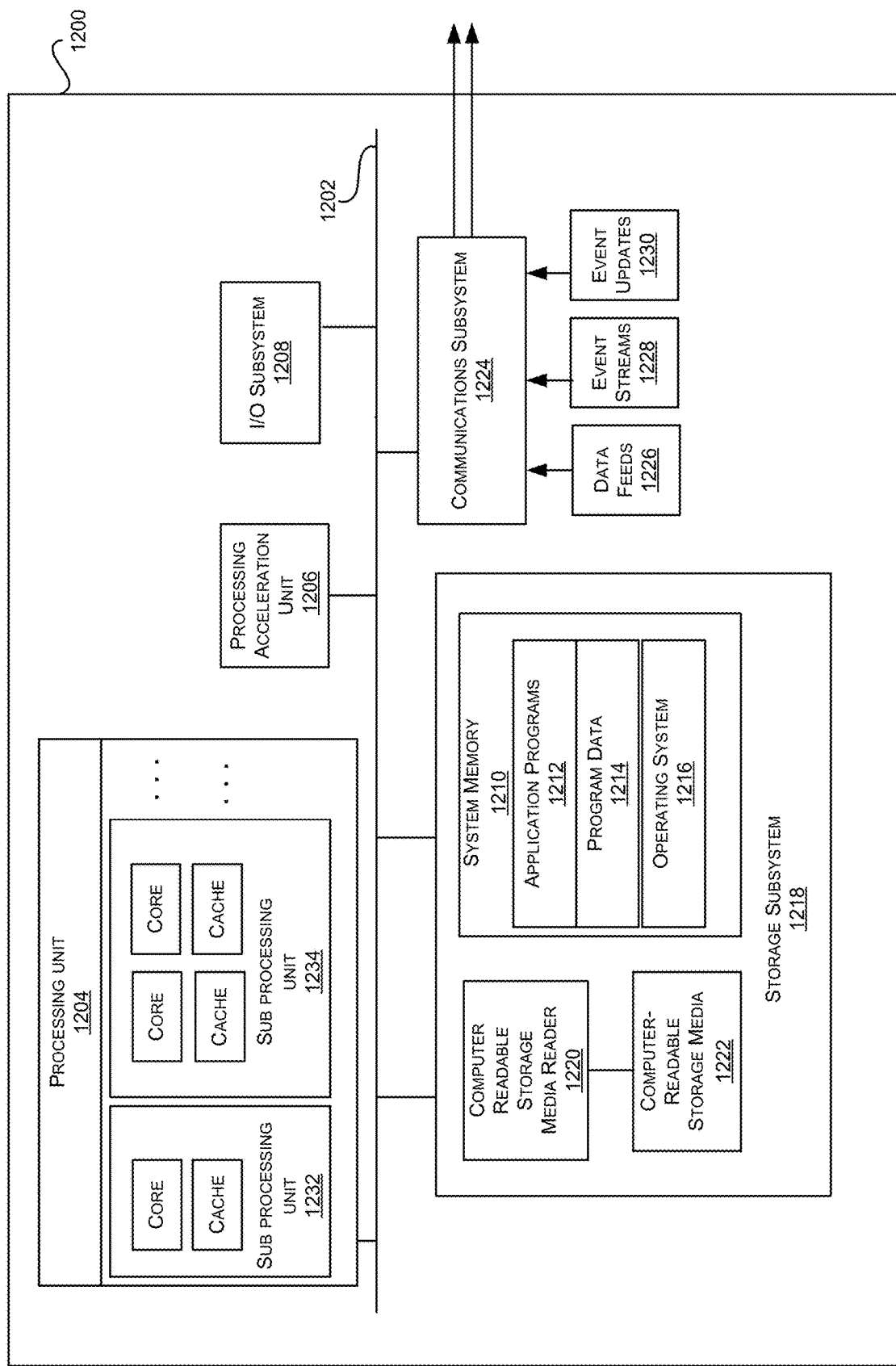
FIG. 12 illustrates an exemplary computer system, in which various embodiments may be implemented.

FIG. 12 illustrates an exemplary computer system 1200, in which various embodiments of the present invention may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present invention.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of managing runtime states and service configurations for containers in a multi-tenant environment, the method comprising:
   receiving an indication that a request has been received for a service provided in the multi-tenant environment;
   identifying a configuration that implements the service, wherein the configuration is stored in a data store;
   sending the configuration to a container in the multi-tenant environment to service the request;
   receiving a runtime state from the container; and
   storing the runtime state in the data store, wherein the configuration is flushed from the container.

2. The method of claim 1, wherein the configuration is provided by a tenant of the multi-tenant environment prior to runtime.

3. The method of claim 1, wherein the data store comprises a key-value data store.

4. The method of claim 3, wherein the key-value data store comprises a distributed key-value data store.

5. The method of claim 3, wherein an identity of a tenant associated with the service comprises a key in the key-value data store, and wherein the configuration and runtime state comprise a value in the key-value data store.

6. The method of claim 1, wherein the data store also stores a registry of containers that are available in the multi-tenant environment.

7. The method of claim 6, wherein the data store updates one or more routers in the multi-tenant environment when new containers become available in the multi-tenant environment based on the registry of containers.

8. The method of claim 1, further comprising:
   receiving an indication that a second request has been received for the service after the configuration is flushed from the container;
   sending the configuration to a second container in the multi-tenant environment to service the second request;
   sending the runtime state to the second container;
   receiving an updated runtime state from the second container; and
   storing the updated runtime state in the data store.

9. A non-transitory computer-readable medium comprising instructions that, when executed by one or more processors, causes the one or more processors to perform operations comprising:
   receiving an indication that a request has been received for a service provided in a multi-tenant environment;
   identifying a configuration that implements the service, wherein the configuration is stored in a data store;
   sending the configuration to a container in the multi-tenant environment to service the request;
   receiving a runtime state from the container; and storing the runtime state in the data store, wherein the configuration is flushed from the container.

10. The non-transitory computer-readable medium of claim 9, wherein the operations further comprise:
   assigning a plurality of containers to a first tenant in the multi-tenant environment;
   identifying one or more containers in the plurality of containers that are assigned to the first tenant but that are not being used by the first tenant;
   flushing contents of the one or more containers; and
   reassigning the one or more containers to a second tenant in the multi-tenant environment.

11. The non-transitory computer-readable medium of claim 10, wherein after flushing the contents of the one or more containers, the one or more containers are not assigned to any tenant for a first time interval before being reassigned to the second tenant.

12. The non-transitory computer-readable medium of claim 10, wherein the operations further comprise:
   identifying second one or more containers in the plurality of containers that are assigned to the first tenant but that are not being used by the first tenant;
   determining that no other tenants need the second one or more containers; and
   removing the second one or more containers from the multi-tenant environment.

13. The non-transitory computer-readable medium of claim 10, wherein the operations further comprise:
   determining that the first tenant is receiving more requests than can be serviced by the plurality of containers.

14. The non-transitory computer-readable medium of claim 13, wherein the operations further comprise:
   instantiating a new plurality of containers; and
   assigning the new plurality of containers to the first tenant.

15. The non-transitory computer-readable medium of claim 13, wherein the operations further comprise:
   assigning containers that were previously assigned to another tenant to the first tenant.

16. The non-transitory computer-readable medium of claim 10, wherein a gateway of the multi-tenant environment reassigns the one or more containers to the second tenant in the multi-tenant environment.

17. A system comprising:
   one or more processors; and
   one or more memory devices comprising instructions that, when executed by the one or more processors, cause the one or more processors to perform operations comprising:
      receiving an indication that a request has been received for a service provided in a multi-tenant environment;
      identifying a configuration that implements the service, wherein the configuration is stored in a data store;
      sending the configuration to a container in the multi-tenant environment to service the request;
      receiving a runtime state from the container; and
      storing the runtime state in the data store, wherein the configuration is flushed from the container.

18. The system of claim 17, wherein the operations further comprise:
   receiving a first request for a first service provided by a first tenant;
   selecting an empty container in the multi-tenant environment;
   loading a first configuration that implements the first service into the container;
   servicing the first request from the container;
   receiving a second request for a second service provided by a second tenant;
   flushing the first configuration from the container, wherein after flushing the first configuration from the container, the container comprises a runtime process with an embedded server and an internal endpoint; and
   servicing the second request from the container.

19. The system of claim 18, wherein the container is one of a plurality of containers in the multi-tenant environment that are instantiated to service requests from client devices.

20. The system of claim 18, wherein the first configuration comprises a size of a heap in memory that can be used by the first service.

* * * * *